United States Patent Office 3,501,091
Patented Mar. 17, 1970

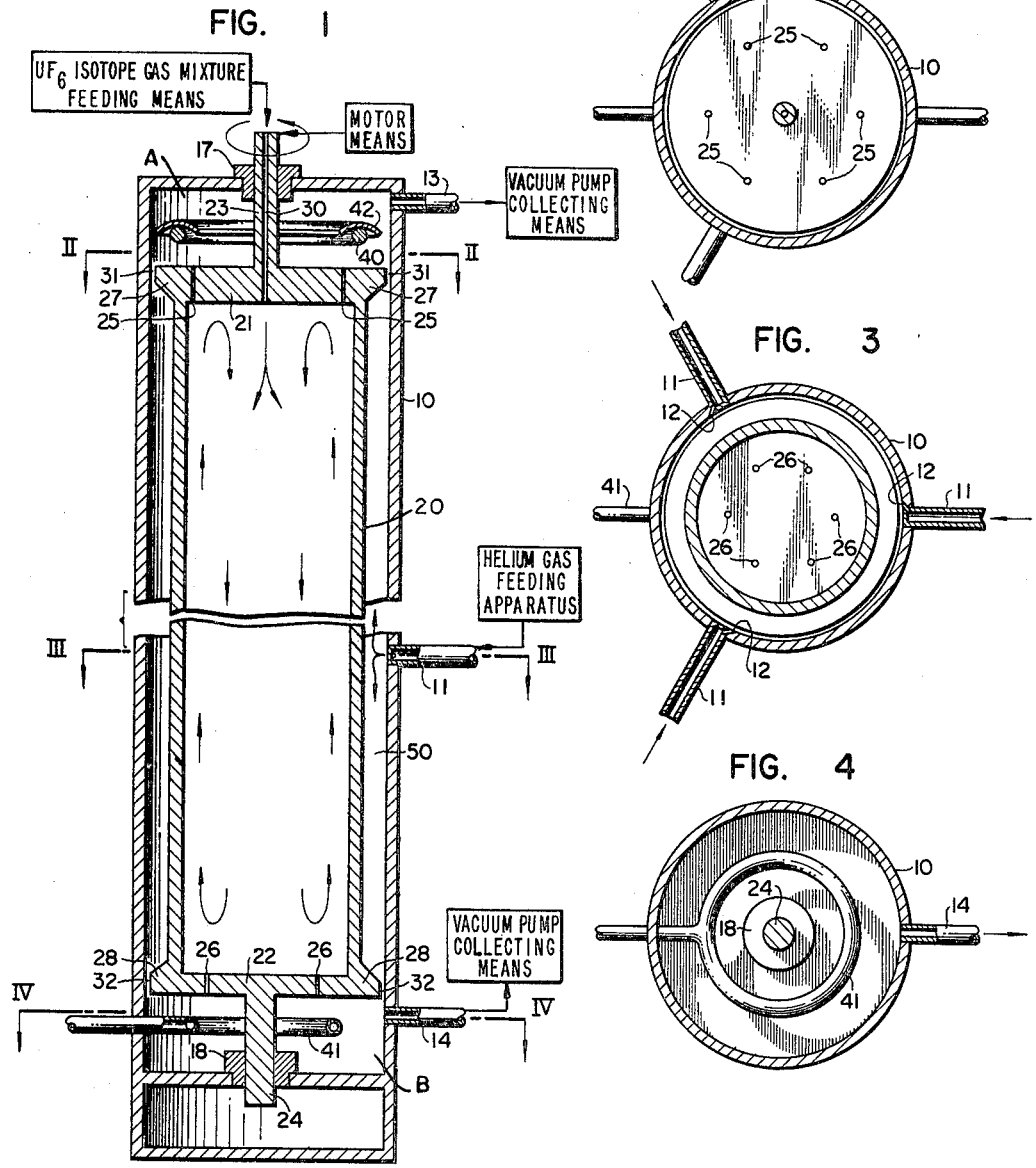

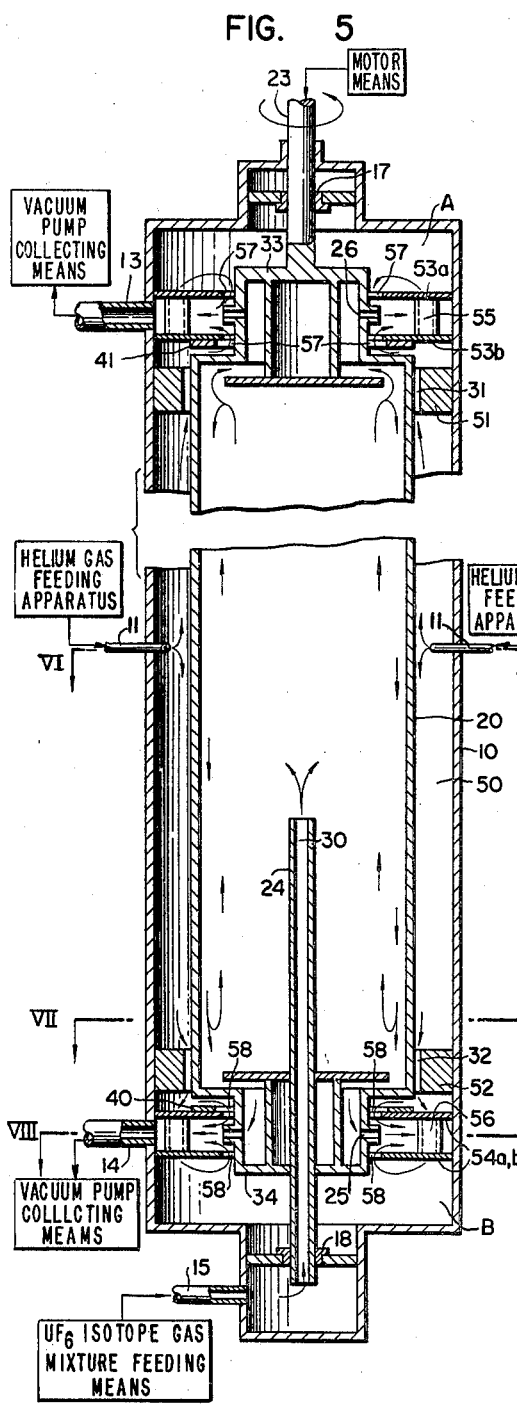

3,501,091
GAS CENTRIFUGE AND A PROCESS FOR CONCENTRATING COMPONENTS OF A GAS MIXTURE
Yoshitoshi Oyama and Yoichi Takashima, Tokyo, Japan, assignors to Atomic Fuel Corporation, Tokyo, Japan
Filed Mar. 21, 1967, Ser. No. 624,932
Int. Cl. B01d 45/12
U.S. Cl. 233—1          15 Claims

ABSTRACT OF THE DISCLOSURE

A gas centrifuge having a rotary chamber within an outer chamber, holes in each end of the rotary chamber for the draining of respectively enriched gas and poor gas and a means to flow a gas of relatively low molecular weight into the region between the outer chamber and the surface of the rotary chamber, thence to sweep toward the ends of the rotary chamber.

A process for separating a gas mixture in the above type of centrifuge, including the step of flowing a gas of relatively low molecular weight into the space between the surface of the rotary chamber and the outer chamber, thence to sweep toward the ends of the cylinder.

FIELD OF THE INVENTION

This invention relates to means for separating mixtures of fluids or fluent materials into constituent parts, comprising containers adapted to receive the mixtures, which containers are susceptible of being rotated or revolved at a high velocity and are provided with imperforate walls or equivalent resistant surfaces, against which the mixtures become stratified by the action of centrifugal force. More particularly this invention relates to gas centrifuges and to gas centrifuges to be used to concentrate uranium 235 hexafluoride.

DESCRIPTION OF THE PRIOR ART

Natural uranium hexafluoride has 99.3% uranium 238 hexafluoride and 0.7% uranium 235 hexafluoride as mixed. A centrifuging process is adopted as one of the methods of separating and concentrating uranium 235 hexafluoride. In a conventional centrifuge used for such purposes, a uranium hexafluoride gas is fed into a cylinder rotating at a high velocity within a fixed outer chamber, is accelerated in the counter current and is at the same time subjected to a separating aciton by a centrifugal force field so that a concentrated gas of uranium 235 may be made at one end of the cylinder and a diluted gas of uranium 235 may be made at the other end and the respective separated gases are separately taken out through hollow shafts fixed to the upper and lower end plates of the cylinder. In such structure, since the separated gases must be pulled out through a high vacuum part, various difficulties arise in practice.

As a manner of overcoming such difficulties, there is a method wherein small holes are made in the upper and lower end plates of the cylinder so that the concentrated gas and diluted gas uranium 235 may be respectively jetted out through said small holes into spaces between the fixed outer chamber and the cylinder. However, in such a case, the outer surface of the cylinder, rotating at a high speed, will be surrounded by the uranium hexafluoride gas having a very large molecular weight. Therefore the cylinder will be subjected to a high rotary resistance and the loss of power will become large. If, in order to avoid this defect, for example, the spaces are kept under a vacuum below 0.01 mm. Hg, the power required for the centrifuge itself will decline but the power required for the vacuum pump to make the vacuum will remarkably increase and therefore, as a result, the initial object of reducing power will not be attained. In addition, lest the concentrated uranium gas and the diluted uranium gas should again mix together in the above mentioned spaces, a narrow clearance, for example, of 0.1 mm. or less must be formed between the spaces but therewith machining and assembling become difficult and an accidental contact and seizure is likely to occur.

SUMMARY OF THE INVENTION

An object of the present invention is to provide a gas centrifuge wherein an inert, light gas of a mass much smaller than that of uranium hexafluoride is introduced into the annular space part between a fixed outer cylinder and an inner rotary cylinder so that, when said inner cylinder rotates at a high velocity, it is subjected to only a very small drag, its driving power consumption thereby being reduced.

Another object of the present invention is to provide a gas centrifuge wherein, when a comparatively concentrated gas of uranium 235 and a comparatively diluted gas of uranium 235 are separated respectively in both end parts within a cylinder rotating at a high velocity and are jetted or, more generally, drained out through several small holes made in both end parts of the cylinder, both separated gases will be prevented from again mixing together and there will be no fear of causing accidental contact between cylinder and outer chamber.

A further object of the present invention is to provide a gas centrifuge wherein the power required for a vacuum pump for sucking and conveying a separated gas and an inert gas together is approximately 1 mm. Hg. which is far smaller, than in the case of the high vacuum such as 0.01 mm. Hg. needed in the prior art.

According to the present invention, the centrifuge achieving these objects has a fixed outer chamber and a cylinder which rotates at a high velocity within said fixed outer chamber. A "neck portion," forming a narrow clearance with the inside wall surface of the fixed outer chamber, is provided near each of the upper and lower end plates of the cylinder. Such neck portion may be formed by projecting in the form a flange the part near each end plate of the columnar cylinder, by securing an annular projection to the inside wall surface of the fixed outer chamber or by providing projections in both. In short, the cylindrical surface occupying the greater part of all the outside surface area of the cylinder is located between the neck portions.

According to the present invention, pipes for feeding inert gas of a mass far lighter than that of uranium hexafluoride gas such as, for example, hydrogen or helium gas, are connected to the central part of the fixed outer chamber so that inert gas may be introduced into the annular space bounded by the projections forming the above mentioned neck portions, the cylindrical outside surface of the cylinder and the inside wall surface of the fixed outer chamber opposed to said cylindrical surface. At least three of such light gas feeding pipes are arranged at angular intervals of 120 degrees around the annular space so as to uniformly feed the gas. It is preferable that each feeding pipe should jet the gas tangentially to the outside surface of the cylinder at a velocity substantially equal to the peripheral velocity of the cylinder. Thus, the cylinder will be surrounded on its outer cylindrical surface part occupying the greater part of its outside surface area and further on both end surface parts with the light gas rotating at a velocity substantially equal to the peripheral velocity of the cylinder so that the cylinder may make a stable high velocity rotation and may be subjected to only little resistance.

Such inert gas will sweep into the upper and lower gas chamber regions provided at both ends of the cylinder from said annular space through the above mentioned reduced neck portion. Small holes are made in both end plates of the cylinder so that a concentrated uranium 235 gas and a diluted uranium 235 gas separated in the regions of enrichment of the cylinder may jet into the said respective gas chambers. The clearances of both neck portions are designed so that the separated uranium gases of both ends are not mixed by diffusion and the power is not increased. With the flow of light gas, such design is easily achieved, without danger of contact between the cylinder and the outer chamber.

Thus, the separated gases and the inert, light gas are made to join together. In case they are to be sucked out together by a vacuum pump, the gas pump may maintain a vacuum of about 1 mm. Hg and therefore the driving power for the vacuum pump is small. The separated gas and the inert light gas mixture thus taken out can be simply separated from each other by condensation and separation.

As used in the following, "gas of low molecular weight relative to the components of the gas mixture to be separated" means any gas having a molecular weight lower than that of every component present in the gas mixture. In a preferred form of the invention, the difference between the molecular weight of the gas of low molecular weight and the weights of the components of the mixture is in the vicinity of the difference between $UF_6$ and helium gas. "Molecular weight," as used herein, is meant to include the atomic weight of a monatomic gas.

"End," when used in reference to cylinders herein is not meant to exclude all cylindrical surface of a cylinder.

It is intended that the invention should include the use of a gas of low molecular weight in all centrifuges in which there is a danger of drag or remixing caused by the movement of gas mixture components onto the outer surface of the rotary member thereof.

Other objects and many of the attendant advantages of this invention will be readily appreciated as the same becomes better understood by reference to the following detailed description when considered in connection with the accompanying drawings in which like reference numerals designate like parts throughout the figures thereof.

BRIEF DESCRIPTION OF THE DRAWING

FIGURE 1 is a vertically sectioned view of a gas centrifuge embodying the present invention, the intermediate part being omitted;

FIGURES 2, 3 and 4 are cross-sectioned views on lines II—II, III—III and IV—IV, respectively, as seen in the directions indicated by the arrows in FIG. 1;

FIGURE 5 is a vertically sectioned view of another embodiment of the present invention, the intermediate part being omitted, as in FIG. 1;

FIGURES 6, 7 and 8 are cross-sectioned views on lines VI—VI, VII—VII and VIII—VIII, respectively, as seen in the directions indicated by the arrows in FIG. 5.

DESCRIPTION OF THE PREFERRED EMBODIMENTS

In the first embodiment illustrated in FIG. 1, three helium gas feeding pipes 11, connected with a helium gas feeding apparatus, are radially connected at angular intervals of 120 degrees to the central part of a long, fixed outer cylindrical chamber 10. As evident from FIG. 3, each pipe 11 has in its tip a small nozzle 12 aimed in the same direction as the rotation of inner cylinder 20 and tangentially to the outer surface thereof. Separated gas sucking pipes 13 and 14 connected with vacuum pump collecting means are fixed respectively near both end regions A and B of the fixed outer cylinder 10.

The small, long inner cylinder 20 is fitted within said fixed outer cylinder 10 and is rotated in the direction indicated by the arrow at such high velocity that its peripheral velocity reaches, for example, 350 meters/second. An upper shaft 23 and lower shaft 24 made integral with an upper end plate 21 and lower end plate 22, respectively, of the inner cylinder are rotatably supported with bearings 17 and 18, respectively. A gas inlet port 30 for feeding a uranium hexafluoride gas into the cylinder 20 from outside is made in the center of the upper shaft. As evident from FIGS. 2 and 3, six small holes 25 and 26 are made in the upper end plate 21 and lower end plate 22, respectively, so as to form drain holes for a concentrated uranium gas and a diluted uranium gas as separated gases from regions of enrichment in U235 and enrichment in U238. Flange-shaped projecting parts 27 and 28 extend out in the outside parts of the respective end plates so as to form annular narrow clearances 31 and 32, respectively, between them and the inside wall surface of the fixed outer cylinder.

In the respective spaces formed by the end plates of the fixed outer cylinder 10 and the end plates of the inner cylinder 20, a heating device 40 for heating the upper end plate 21 is fitted on the side of the gas inlet port 30 and a cooling device 41 for cooling the lower end plate 22 is fitted on the other side. The heating device 40 and cooling device 41 to be used may be any known conventional ones. For example, an infrared ray heater or steam heater may be used for the heating device. It is preferable to conduct heat to only the end plate part of the columnar cylinder. In the illustrated embodiment, a reflector 42 is fixed to the heating device 40 so that effectively only the upper end plate 21 is heated.

During operation, a uranium hexafluoride gas is fed into the inner cylinder 20 through the gas inlet port 30. The separating action is achieved by the centrifuging action of the high-velocity rotation of the inner cylinder and at the same time by the thermal influences from both end plates 21 and 22 by the heating device 40 and cooling device 41. The heating and cooling devices produce thermal gradients which maintain the counter-current flow as shown by the flow arrows. A gas containing a comparatively large amount of uranium 235 hexafluoride as mixed collects in the lower part of the inner cylinder 20 while a gas containing only a comparatively small amount of uranium 235 hexafluoride as mixed collects in the upper part. These separated gases will jet out respectively through the small holes 26 and 25 and will be sucked out by the respective sucking pipes 14 and 13 connected with the vacuum pump. At the same time, a helium gas is jetted into the annular space part 50 through the small orifice 12 at the tip of each feeding pipe 11 so that the stability of the inner cylinder 20 rotating at a high velocity may not be disturbed. The inner cylinder 20 will rotate surrounded with the helium gas on the greater part of its outside surface. This helium gas sweeps out through the annular clearances 31 and 32, joins with the above-mentioned separated gases and is sucked out through the sucking pipes 13 and 14. In the drawing, the arrows indicate the directions of the flow of these gases.

In the second embodiment illustrated in FIG. 5, small crown-shaped bodies 33 and 34 project at the respective ends of the inner cylinder 20 and the upper shaft 23 and lower shaft 24 are respectively fixed to the end surfaces. A uranium hexafluoride gas is fed into the inner cylinder 20 through the inlet port 30 made in the center of the lower shaft 24 through the pipe 15. As shown in FIG. 8, small holes 25 and 26 through which the separated gases are to jet out are made radially in the peripheral walls of the respective small crown-shaped bodies 33 and 34 and open respectively between upper annular partition plates 53a, 53b and lower annular partition plates 54a, 54b secured in pairs to the inside wall surface of the fixed outer cylinder 10. Annular clearances 57 and 58 are made between said annular partition plates 53a, b and 54a, b and the cylindrical outside surface of the small crown-shaped bodies 33 and 34, respectively. Four flat elliptic communicating pipes 55a–d and 56a–d are passed through the annular partition plates 53a, b and 54a, b, respectively. The separated gas sucking pipes 13 and 14 connected with the vacuum pump are also connected to the spaces between the plates. Further, in this embodiment, annular projections 51 and 52 are secured to the inside wall surface of the fixed outer cylinder 10 so that narrow annular clearances 31 and 32 which are the neck portion may be formed between them and the outside surface of the inner cylinder 20 in the shoulder parts of said cylinder 20. The eight helium gas feeding pipes fixed to the intermediate part of the fixed outer cylinder 10 are bent in the tip parts in the direction of the rotation of the inner cylinder 20. This is shown in FIG. 6.

In this embodiment, too, the uranium hexafluoride gas fed into the columnar cylinder 20 through the inlet port 30 is separated into a gas containing a comparatively large amount of uranium 235 hexafluoride as mixed and a gas containing only a comparatively small amount of uranium 235 hexafluoride as mixed. This arises due to the centrifuging action and the separating action due to the thermal action of the heater 40 and cooler 41. The two separated gas mixtures jet out through the respective small holes 26 and 25. Helium gas flowed into the annular space 50 through the pipes 11 passes partly through the communicating pipes 55a–d and 56a–d and the outsides of the upper annular partition plates 53a, b and lower annular partition plates 54a, b in respective pairs. The helium passes through the annular clearances 57 and 58, mixes respectively with the above mentioned separated gases and is sucked out through the sucking pipes 13 and 14. The outside surface of the inner cylinder 20 to be surrounded by the helium gas can be made larger than in the first embodiment.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

We claim:
1. A gas centrifuge for separating a mixture of gases of different molecular weight, comprising:
 (a) an outer chamber;
 (b) a rotary chamber situated within said outer chamber and mounted rotatably thereto;
 (c) means to allow draining of gas from the rotary chamber's internal region of enrichment of the higher-molecular-weight part of said mixture into one region between said outer chamber and said rotary chamber;
 (d) means to allow draining of gas from said one region to the outside of said outer chamber;
 (e) means to allow draining of gas from the rotary chamber's internal region of enrichment of the lower-molecular-weight part of said mixture into another region between said outer chamber and said rotary chamber;
 (f) means to allow draining of gas from said another region to the outside of said outer chamber;
 (g) a light gas conducting means to flow gas of low molecular weight relative to the components of said mixture into those regions external to said one region and said another region between said outer chamber and said rotary chamber, said gas of low molecular weight thence sweeping into said one region and said another region;
 (h) and a light gas supply means to supply said gas of low molecular weight to said light-gas conducting means.

2. A gas centrifuge as claimed in claim 1, said rotary chamber being a substantially cylindrical chamber mounted rotatably about its cylindrical axis; said one region being the region (A) between the outer chamber and one end of said cylindrical chamber; said another region being the region (B) between the outer chamber and the other end of said cylindrical chamber; said those regions being the region between the outer chamber and the cylindrical surface of said cylindrical chamber.

3. A centrifuge as claimed in claim 2, said means to flow gas including means to give said gas of low molecular weight vector flow components parallel to the velocity vectors of said cylindrical surface.

4. A centrifuge as claimed in claim 2, said gas of low molecular weight being inert.

5. A centrifuge as claimed in claim 2, said mixture comprising a mixture of gases containing the isotopes of uranium.

6. A centrifuge as claimed in claim 5, said gas of low molecular weight being helium.

7. A gas centrifuge as claimed in claim 2, further comprising:
 means at the circumferences of the two ends of said cylindrical chamber to limit there the radial separation between said outer chamber and said cylindrical chamber;
 said region (A) being further bounded by the means to limit associated with said one end of the cylindrical chamber;
 said region (B) being further bounded by the means to limit associated with said other end of the cylindrical chamber.

8. A gas centrifuge as claimed in claim 7, further comprising separate evacuating means communicating with said regions (A) and (B).

9. A gas centrifuge as claimed in claim 7, further comprising means to produce a thermal gradient within said cylindrical chamber.

10. A gas centrifuge as claimed in claim 7, further comprising two annular partition plates (53a, 53b, 54a, 54b) in each of said regions (A) and (B); said partition plates being separated in their regions, connected at their outer peripheries to said outer chamber, projecting radially inwardly toward said cylindrical chamber and having their inner peripheries spaced from said cylindrical chamber; the means to allow draining of gas from the cylindrical chamber feeding into the spaces between said partition plates; said means "to allow draining of gas from the regions" communicating from the spaces between said partition plates and the outside of said outer chamber; said centrifuge further comprising a plurality of pipes (55, 56) in each region, said pipes passing through the partition plates in each region and the spaces between them and connecting the parts of said regions outside of the spaces between said partition plates.

11. A process for separating a mixture of gases of different molecular weight in a centrifuge including an outer chamber and a rotary chamber situated within said outer chamber and mounted rotatably thereto, comprising the steps of rotating the rotary chamber, feeding said mixture of gases into the rotary chamber draining differently enriched parts of the gas mixture from the interior of the rotary chamber into different regions between the outer chamber and the rotary chamber and thence draining said differently enriched parts of the gas mixture from said different regions to the outside of the outer chamber, wheren the improvement comprises the steps of flowing a gas of low molecular weight relative to the components of said mixture into those regions between the outer chamber and the rotary chamber outside of said different regions, and thence sweeping said gas of low molecular weight into said different regions.

12. A process as claimed in claim 11, said rotary chamber being a substantially cylindrical chamber mounted rotatably about its cylindrical axis; there being two differently enriched parts; said different regions being those at the ends of said cylindrical chamber; said those regions being the region between the outer chamber and the cylindrical surface of said cylindrical chamber; said sweeping being toward the ends of said cylindrical chamber.

13. A process as claimed in claim 12, said step of flowing being done in vector directions parallel to the velocity vectors of said cylindrical surface.

14. A process as claimed in claim 12, said step of draining said differently enriched parts from the outer chamber being done under vacuum.

15. A process as claimed in claim 12, further comprising the step of providing a thermal gradient within said cylindrical chamber.

References Cited

UNITED STATES PATENTS

| | | | |
|---|---|---|---|
| 2,876,949 | 3/1959 | Skarstrom | 233—11 |
| 2,936,110 | 5/1960 | Cohen | 233—13 |
| 3,281,067 | 10/1966 | Beyerle et al. | 233—1 X |
| 3,289,925 | 12/1966 | Zippe et al. | 233—13 X |

WILLIAM I. PRICE, Primary Examiner

U.S. Cl. X.R.

233—11, 13